United States Patent
Harada et al.

(10) Patent No.: US 9,515,361 B2
(45) Date of Patent: Dec. 6, 2016

(54) BATTERY MODULE

(75) Inventors: Susumu Harada, Tokyo (JP); Atsuo Suga, Hitachinaka (JP); Atsushi Sekine, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 80 days.

(21) Appl. No.: 14/401,706

(22) PCT Filed: May 17, 2012

(86) PCT No.: PCT/JP2012/062698
§ 371 (c)(1),
(2), (4) Date: Nov. 17, 2014

(87) PCT Pub. No.: WO2013/171885
PCT Pub. Date: Nov. 21, 2013

(65) Prior Publication Data
US 2015/0140388 A1 May 21, 2015

(51) Int. Cl.
| | | |
|---|---|---|
| H01M 10/052 | (2010.01) | |
| H01M 10/6556 | (2014.01) | |
| H01M 2/10 | (2006.01) | |
| H01M 10/625 | (2014.01) | |
| H01M 10/647 | (2014.01) | |
| H01M 10/613 | (2014.01) | |
| H01M 10/656 | (2014.01) | |

(52) U.S. Cl.
CPC ....... *H01M 10/6556* (2015.04); *H01M 2/1077* (2013.01); *H01M 10/5004* (2013.01); *H01M 10/5016* (2013.01); *H01M 10/5061* (2013.01); *H01M 10/613* (2015.04); *H01M 10/625* (2015.04); *H01M 10/647* (2015.04); *H01M 2220/20* (2013.01)

(58) Field of Classification Search
CPC ....................... H01M 10/613; H01M 10/6556
See application file for complete search history.

(56) References Cited

U.S. PATENT DOCUMENTS

| | | | |
|---|---|---|---|
| 4,578,324 A * | 3/1986 | Koehler | F28D 15/0275 429/434 |
| 5,985,483 A | 11/1999 | Verhoog et al. | |
| 6,482,542 B1 | 11/2002 | Takaki et al. | |
| 6,586,132 B1 * | 7/2003 | Fukuda | H01M 2/1077 429/120 |
| 2009/0325054 A1 | 12/2009 | Payne et al. | |

FOREIGN PATENT DOCUMENTS

| | | |
|---|---|---|
| JP | 11-273752 A | 10/1999 |
| JP | 2001-237582 A | 8/2001 |
| JP | 2004-207458 A | 7/2004 |
| JP | 2008-181733 A | 8/2008 |

(Continued)

*Primary Examiner* — Stewart Fraser
*Assistant Examiner* — Olatunji Godo
(74) *Attorney, Agent, or Firm* — Volpe and Koenig, P.C.

(57) ABSTRACT

A battery module of includes a plurality of cells, a cooling plate, and a channel part formed in the cooling plate. The channel part includes a first channel part extending in an arrangement direction of the plurality of cells, a second channel part extending in parallel to the first channel part along the arrangement direction with a first partition part interposed between the first channel part and the second channel part, and a first communication part which brings one end of the first channel part of the arrangement direction and one end of the second channel part of the arrangement direction into communication with each other, and which turns a flowing direction of coolant in the first channel part and the second channel part.

18 Claims, 13 Drawing Sheets

(56) References Cited

FOREIGN PATENT DOCUMENTS

| JP | 2000-251953 A | 9/2009 |
| JP | 2010-062130 A | 3/2010 |
| JP | 2011-175743 A | 9/2011 |
| JP | 2011-192642 A | 9/2011 |
| JP | 2011-525691 A | 9/2011 |

* cited by examiner

BATTERY MODULE

TECHNICAL FIELD

The present invention relates to a battery module configured by connecting a plurality of rechargeable/dischargeable cells to each other.

BACKGROUND ART

A battery module provided in a hybrid vehicle, an electric vehicle and the like as a power source device is configured by connecting, to each other, a plurality of cells such as a lithium-ion rechargeable battery, a nickel-hydride rechargeable battery and a nickel-cadmium rechargeable battery for example. Generally, charge-and-discharge current of a battery module is large, heat values of the cells also become large and as a result, temperature of the cell itself also largely rises. It is preferable that temperature rise of a cell is suppressed as small as possible in terms of battery life, and it is necessary to swiftly cool the battery.

One method of swiftly cooling the plurality of cells, there is using liquid coolant. For example, there is known a method that a plurality of cells are coupled to each other and arranged on one surface of a cooling plate having a channel for coolant through an insulation sheet such that the cells can be cooled, and coolant is supplied to the cooling plate to cool the cells (see PTL 1 for example). As another method having a partition, there is also known a cooling method using a lightweight thin channel compact which can easily be produced by forming a coolant channel from a laminated film (see PTL 2 for example).

CITATION LIST

Patent Literatures

PTL 1: JP 2010-62130 A
PTL 2: JP 2004-207458 A

SUMMARY OF INVENTION

Technical Problem

However, in the case of a coolant passage having a constant cross section and extending straight like a coolant passage described in PTL 1, flow of coolant in the coolant passage is uniform, heat transfer is small, temperature distribution is prone to be formed in a flowing direction of coolant of the cooling plate, and it is difficult to sufficiently secure the temperature uniformity between cells in a battery module.

An object of the invention is to provide a reliable and compact battery module in which the conventional technique is improved, excellent heat transfer is established between coolant and a cooling plate by a coolant channel having a relatively simple structure, a temperature distribution of the cooling plate is made further uniform, temperatures of a plurality of cells are made uniform, temperature rise of the cells caused by recharging and discharging operations of the cells is reduced and is made further uniform, and variation in recharging and discharging amounts and cell lives between the cells is reduced.

Solution to Problem

To solve the problem, configurations described in claims for example are employed. As one example among a plurality of solutions to the problem, the invention provides a battery module including a plurality of cells, a cooling plate having a plate surface on which the plurality of cells are arranged, and a channel part which is formed in the cooling plate and through which coolant can flow, wherein the channel part includes a first channel part extending in an arrangement direction of the plurality of cells, a second channel part extending in the arrangement direction on one side of a lateral width direction of the plurality of cells with respect to the first channel part with a first partition part interposed between the first channel part and the second channel part, and a first communication part which brings one end of the first channel part of the arrangement direction and one end of the second channel part of the arrangement direction into communication with each other, and which turns a flowing direction of the coolant in the first channel part and the second channel part.

Advantageous Effects of Invention

According to the invention, the first channel part and the second channel part extend along the arrangement direction with the first partition part interposed therebetween, the one end of the first channel part of the arrangement direction and the one end of the second channel part of the arrangement direction are in communication with each other through the first communication part, and the flowing direction of coolant in the first channel part and the second channel part is turned. A direction of coolant flowing through the first channel part and a direction of coolant flowing through the second channel part are made opposite from each other, heat can be exchanged between the coolant flowing through the first channel part and coolant flowing through the second channel part through the first partition part, and this heat exchange can be carried out in the arrangement direction of the first channel part and the second channel part.

Therefore, when coolant flows from the first channel part to the second channel part for example, temperature of coolant in the second channel part located downstream of the first channel part located upstream becomes higher. However, since the first channel part and the second channel part extend in the arrangement direction with the first partition part interposed therebetween, an upstream portion of the first channel part having low temperature coolant and a downstream portion of the second channel part having high temperature coolant can be opposed to each other, and temperature rise of coolant flowing through the downstream portion of the second channel part can be made small by heat exchange carried out through the first partition part.

Therefore, the temperature distribution of the plate surface of the cooling plate can be adjusted to uniform temperatures of the plurality of cells arranged on the plate surface. Hence, it is possible to provide a reliable and compact battery module in which temperature rise of the cells caused by recharging and discharging operations of the cells is reduced and made further uniform, and variation in recharging and discharging amounts and cell lives between the cells is reduced. Objects, configurations and effects other than those described above will become apparent in the following description of embodiment.

DESCRIPTION OF EMBODIMENTS

Next, an embodiment will be described below using the drawings.

Figure 1:
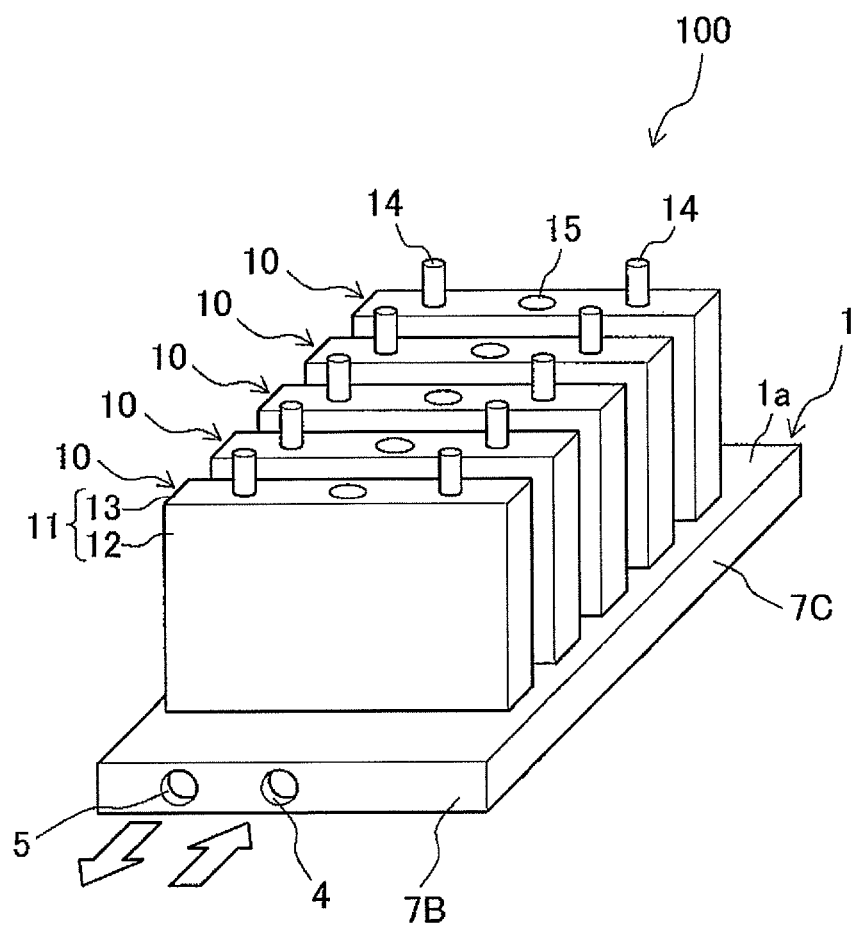
FIG. 1 is a perspective view for describing a cooling structure of a battery module according to an embodiment.
Figure 2:
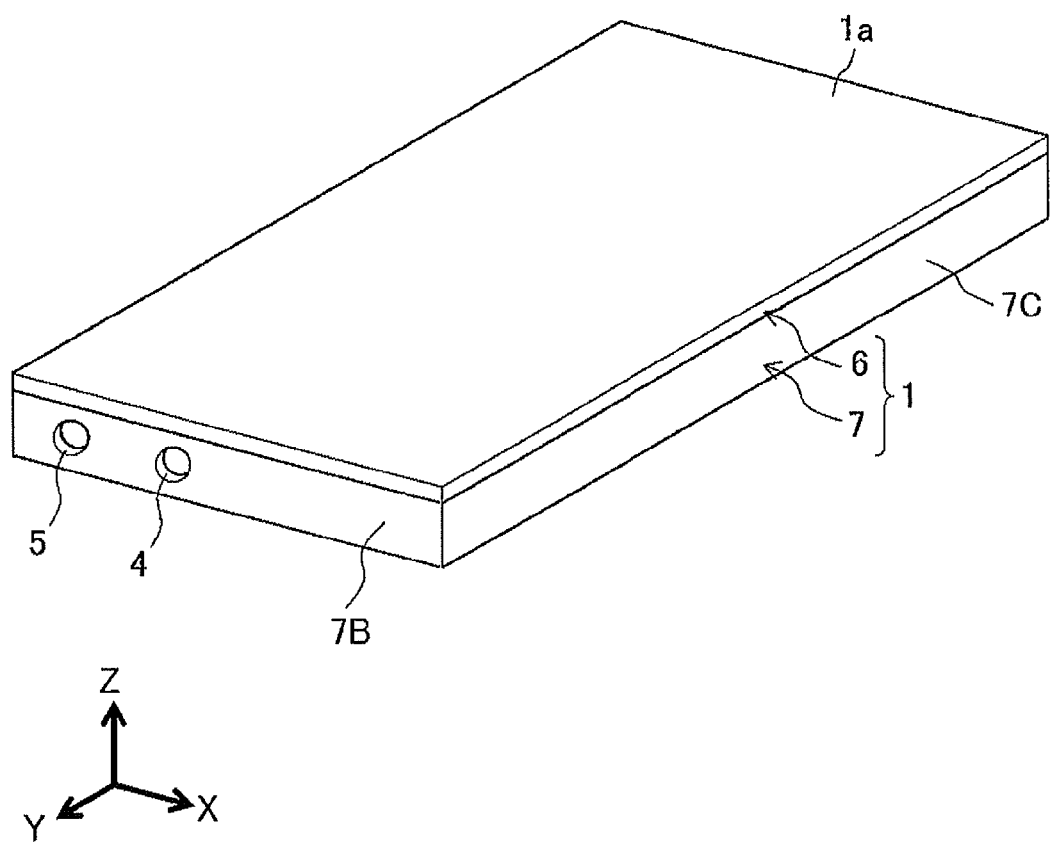
FIG. 2 is a perspective view of a cooling plate according to the embodiment.
Figure 3:
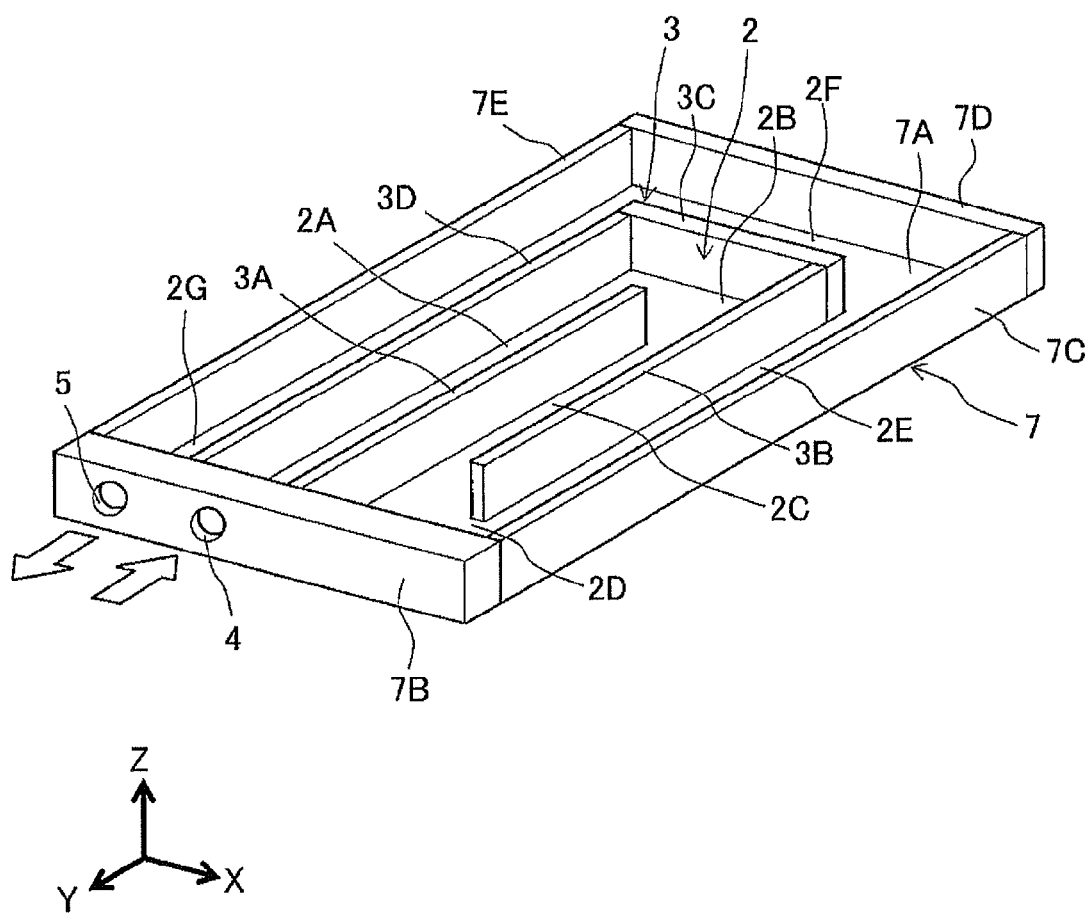
FIG. 3 is a perspective view of an interior of the cooling plate according to the embodiment.
Figure 4:
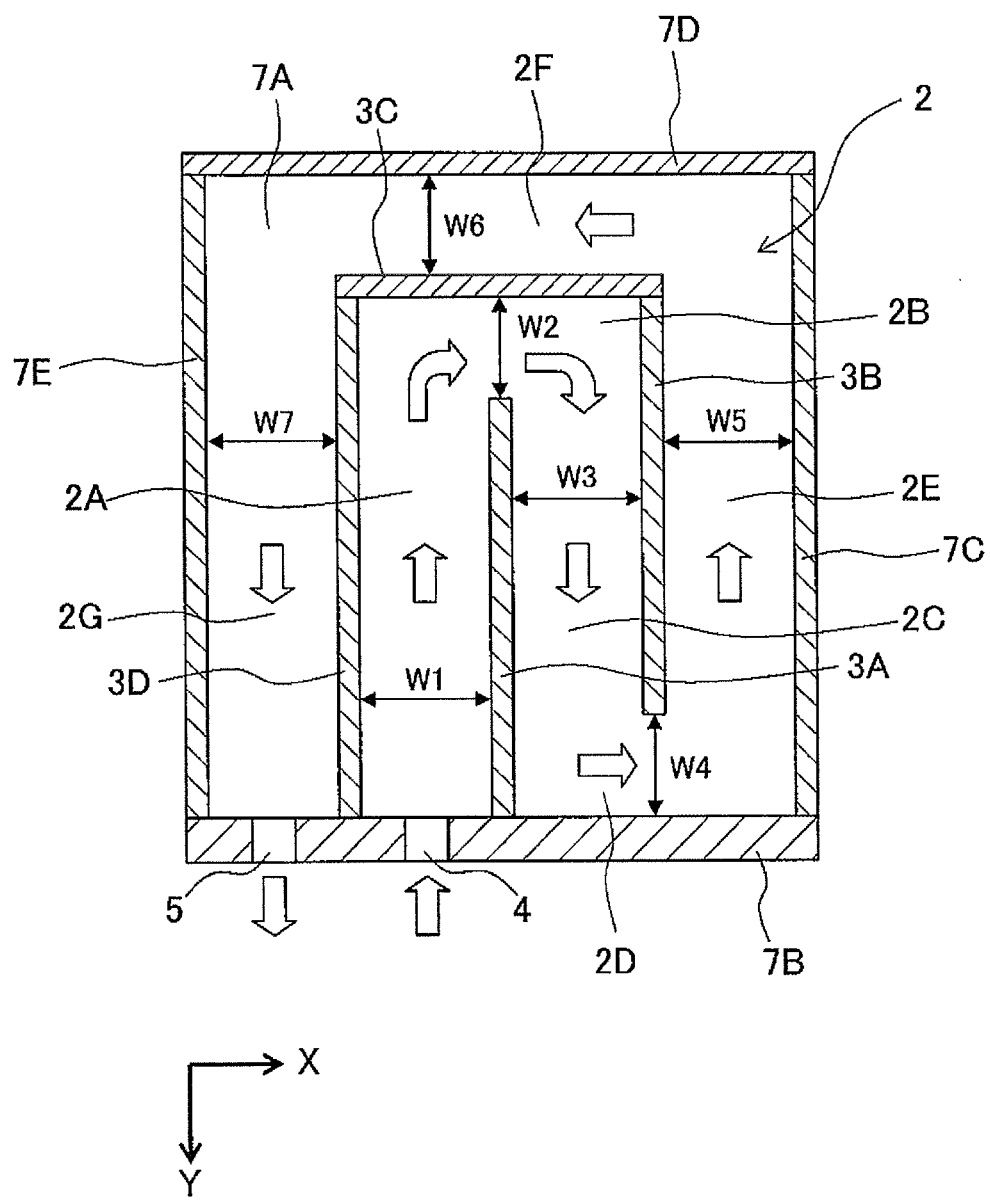
FIG. 4 is a sectional view of a cooling plate according to Example 1.

FIG. 1 is a perspective view showing a cooling structure of a battery module according to the embodiment, FIG. 2 is a perspective view of a cooling plate according to the embodiment, FIG. 3 is a perspective view of an interior of the cooling plate according to the embodiment, and FIG. 4 is a sectional view of a cooling plate according to Example 1.

As shown in FIG. 1, the battery module 100 includes a plurality of cells 10 and a cooling plate (first cooling plate) 1 on which the plurality of cells 10 are arranged. The cell 10 is a rechargeable battery which can be recharged and discharged such as a lithium-ion rechargeable battery for example. The cell 10 is a so-called prismatic cell, and has a flat box-shaped battery container 11. The battery container 11 is composed of a battery can 12 having a laterally long rectangular bottom surface part, a pair of opposed wide surface parts which are bent at a pair of long sides of the bottom surface, and a pair of opposed narrow surface parts which are bent at a pair of short sides of the bottom surface. The battery container 11 is also composed of a lid body 13 which closes an upper opening of the battery can 12 and which is laser-welded to the battery can 12.

The lid body 13 has a laterally long rectangular shape which is substantially equal to that of the bottom surface part of the battery can 12, and both sides of the lid body 13 in its long side direction are provided with a pair of external terminals 14, 14 which are a positive pole and a negative pole. A gas release vent 15 is provided at a central position of the lid body 13 in the long side direction. When pressure in the battery container 11 reaches a predetermined value or more, the gas release vent 15 operates to releases gas in the battery container 11 to outside. In the example shown in FIG. 1 for example, five cells 10 are arranged such that the adjacent wide surface parts are opposed to each other, the cells 10 stand from a plate surface 1a of the cooling plate 1, and the bottom surface part of the battery can is attached to the plate surface 1a of the cooling plate 1 in such a coupled state that heat can be conducted.

The cooling plate 1 has a flat board shape having a predetermined thickness. The plate surface 1a has a substantially rectangular flat surface shape as viewed from above. The plate surface 1a has a lateral width greater than that of the cell 10, and the plate surface 1a extends in an arrangement direction (Y direction) of the cells 10. As shown in FIG. 3, a channel part 2 through which coolant can flow is provided in the cooling plate 1. An end surface part 7B of the cooling plate 1 is provided with a coolant entrance 4 through which coolant flows into the channel part 2 and with a coolant exit 5 through which coolant which passes through the channel part flows out. The coolant entrance 4 is placed at a position close to a central portion in a lateral width direction (X direction) of the end surface part 7B, and the coolant exit 5 is placed at a position close to an outer side in the lateral width direction of the end surface part 7B. A channel is formed in the channel part 2 so that coolant which flows in from the coolant entrance 4 of the cooling plate 1 passes through the channel and flows out from the coolant exit 5 of the cooling plate 1 through the channel.

As shown in FIG. 2, the cooling plate 1 is composed of a container part 7 and an upper plate part 6. The upper plate part 6 is made of metal having excellent heat conductivity such as die-cast aluminum, aluminum and magnesium. If electric insulation with respect to the cell 10 is important, it is possible to use plastic having high withstand voltage such as polyester and polyethylene for the upper plate part 6. As the container part 7 also, it is possible to use metal having excellent heat conductivity such as die-cast aluminum, aluminum and magnesium, and plastic having high withstand voltage such as polyester and polyethylene. When both the upper plate part 6 and container part 7 are made of metal, for example, when they are made of die-cast aluminum, they can be bonded to each other through welding, but they can also be bonded to each other through vacuum furnace brazing. When the upper plate part 6 is made of plastic and the container part 7 is made of metal, bonding surfaces thereof are provided with appropriate sealing members, e.g., packing such as TEFLON (registered trade name). When both the upper plate part 6 and container part 7 are made of plastic, they may be adhered to each other through adhesive or the like.

As shown in FIG. 3, the container part 7 has a shallow dish shape having a predetermined depth, and end surface parts 7B, 7C, 7D and 7E circumferentially and continuously stand along end sides of a substantially rectangular (as viewed from above) lower plate 7A. The upper plate part 6 has a rectangular flat-plate shape which closes the upper portion of the container part 7.

The channel part 2 is formed by partitioning an interior of the container part 7 by a partition part 3. The partition part 3 includes a first partition part 3A, a second partition part 3B, a third partition part 3C and a fourth partition part 3D. Each of the first partition part 3A, the second partition part 3B, the third partition part 3C and the fourth partition part 3D is formed from a plate-shaped member having a predetermined thickness. Each of the partition parts has such a height that a lower end of the partition part is fixed to a lower plate 7A of the container part 7 and an upper end of the partition part abuts against a lower surface of the upper plate part 6. The channel part 2 forms a channel having a rectangular cross section.

Since the channel part 2 is formed by partitioning the interior of the container part 7 by the partition part 3, it is possible to form the channel part 2 more easily than the conventional technique in which a channel part is formed by bending a pipe, and a possibility of leakage of coolant can be lowered.

The channel part 2 includes a first channel part 2A extending along an arrangement direction (Y direction) of the plurality of cells 10, a second channel part 2C extending in the arrangement direction in parallel to the first channel part 2A with the first partition part 3A interposed between the first channel part 2A and the second channel part 2C on one side of the lateral width direction (X direction) of the plurality of cells 10, and a first communication part 2B which brings one end of the first channel part 2A in the arrangement direction and one end of the second channel part 2C in the arrangement direction into communication with each other, and which turns a flowing direction of coolant in the first channel part 2A and a second channel part 2B.

The channel part 2 further includes a third channel part 2E extending in the arrangement direction in parallel to the second channel part 2C with the second partition part 3B interposed between the second channel part 2C and the third channel part 2E on one side of the lateral width direction, and a second communication part 2D which brings the other end of the second channel part 2C in the arrangement direction and the other end of the third channel part 2E in the arrangement direction into communication with each other, and which turns a flowing direction of coolant in the second channel part 2C and the third channel part 2E.

The channel part 2 further includes a fourth channel part 2G extending in the arrangement direction in parallel to the first channel part 2A with a third partition part 3D interposed between the first channel part 2A and the fourth channel part 2G on the other side of the lateral width direction, and a third communication part 2F which extends in the lateral width direction on one side of the arrangement direction with respect to the first communication part 2B with a fourth partition part 3C interposed between the first communication part 2B and the third communication part 2F, which brings one end of the third channel part 2E in the arrangement direction and one end of the fourth channel part 2G in the arrangement direction into communication with each other, and which turns a flowing direction of coolant in the third channel part 2E and the fourth channel part 2G.

Example 1

FIG. 4 is a sectional view of a cooling plate according to Example 1, and is a convenient diagram showing a flow of coolant.

As shown in FIG. 4, coolant flows into the channel part 2 of the cooling plate 1 from the coolant entrance 4, and straightly moves through the first channel part 2A having a channel width W1 toward one side of the arrangement direction. The coolant is deviated in the first communication part 2B having a channel width W2, a flowing direction is turned, and the coolant straightly moves through the second channel part 2C having a channel width W3 toward the other side of the arrangement direction. Then, the coolant is deviated in the second communication part 2D having a channel width W4, the flowing direction is turned, the coolant straightly moves through the third channel part 2E having a channel width W5 toward the one side of the arrangement direction, the coolant is deviated in the third communication part 2F having a channel width W6, the flowing direction is turned, the coolant straightly moves through the fourth channel part 2G having a channel width W7 toward the other side of the arrangement direction, and the coolant is discharged from the coolant exit 5.

Therefore, if the flow is expressed by a shape, a substantially L-shaped coolant channel continues. In Example 1, sizes of the channel width W1 to the channel width W7 are set equally to each other. Hence, flowing speed of coolant is not increased or reduced in the channel part 2, and average speeds of flow in all of channels from the first channel part 2A to the fourth channel part 2G are the same.

Temperature of coolant in the channel part 2 becomes the lowest in the vicinity of the coolant entrance 4. Coolant cools heat of the five cells 10 which generate heat by the recharging or discharging operation shown in FIG. 1. The coolant cools this heat of the five cells 10 through the bottom surface parts of the cells 10 and the upper plate part 6 of the cooling plate 1, and the coolant flows toward the coolant exit 5 while absorbing heat, and gradually rises its temperature.

In Example 1, the first channel part 2A and the second channel part 2C extend along the arrangement direction in parallel to each other with the first partition part 3A interposed therebetween, the one end of the first channel part 2A in the arrangement direction and the one end of the second channel part 2C in the arrangement direction are in communication with each other through the first communication part 2B, and a flowing direction of coolant in the first channel part 2A and the second channel part 2C is turned.

Temperature of coolant in the downstream side second channel part 2C is higher than that in the upstream side first channel part 2A, but the first channel part 2A and the second channel part 2C extend in the arrangement direction with the first partition part 3A interposed therebetween, and a direction of coolant flowing through the first channel part 2A and a direction of coolant flowing through the second channel part 2C are opposite from each other. Therefore, the upstream portion of the first channel part 2A having low temperature coolant and the downstream portion of the second channel part 2C having the high temperature coolant can be opposed to each other, heat can be exchanged, through the first partition part 3A, between the coolant flowing through the first channel part 2A and the coolant flowing through the second channel part 2C, and the heat can be exchanged in the arrangement direction of the first channel part 2A and the second channel part 2C. Therefore, the temperature rise of coolant flowing through the downstream portion of the second channel part 2C can be lowered.

Similarly, the second channel part 2C and the third channel part 2E extend along the arrangement direction with the second partition part 3B interposed therebetween, the other end of the second channel part 2C of the arrangement direction and the other end of the third channel part 2E of the arrangement direction are in communication with each other through the second communication part 2D, and the flowing direction of coolant in the second channel part 2C and the third channel part 2E is turned. Therefore, a direction of coolant flowing through the second channel part 2C and a direction of coolant flowing through the third channel part 2E are opposite from each other, the upstream portion of the second channel part 2C having low temperature coolant and the downstream portion of the third channel part 2E having high temperature coolant can be opposed to each other, heat can be exchanged, through the second partition part 3B, between coolant flowing through the second channel part 2C and coolant flowing through the third channel part 2E, and the heat can be exchanged in the arrangement direction of the second channel part 2C and the third channel part 2E.

Therefore, the temperature rise of coolant flowing through the downstream portion of the third channel part 2E can be made small.

The first communication part 2B and the third communication part 2F extend in parallel to each other along the lateral width direction (X direction) with the third partition part 3C interposed therebetween, and a direction of coolant flowing through the first communication part 2B and a direction of coolant flowing through the third communication part 2F are opposite from each other. Hence, the upstream portion of the first communication part 2B having the low temperature coolant and the downstream portion of the third communication part 2F having the high temperature coolant can be opposed to each other. Therefore, heat can be exchanged, through the third partition part 3C, between the coolant flowing through the first communication part 2B and coolant flowing through the third communication part 2F, and the heat can be exchanged in the lateral width direction of the first communication part 2B and the third communication part 2F. Hence, temperature rise of coolant flowing through the downstream portion of the third communication part 2F can be made small.

The fourth channel part 2G extends in parallel in the arrangement direction along the first channel part 2A with the fourth partition part 3D interposed between the fourth channel part 2G and the first channel part 2A, the one end of the fourth channel part 2G in the arrangement direction and the one end of the third channel part 2E in the arrangement direction are in communication with each other through the third communication part 2F, and the flowing direction of coolant in the third channel part 2E and the fourth channel part 2G is turned. The first channel part 2A and the fourth channel part 2G extend in parallel to each other along the arrangement direction with the fourth partition part 3D interposed therebetween. Therefore, a direction of coolant flowing through the first channel part 2A and a direction of coolant flowing through the fourth channel part 2G are opposite from each other, and the upstream portion of the first channel part 2A having the low temperature coolant and the downstream portion of the fourth channel part 2G having the high temperature coolant can be opposed to each other. Hence, heat can be exchanged, through the fourth partition part 3D, between coolant flowing through the first channel part 2A and coolant flowing through the fourth channel part 2G, and the heat can be exchanged in the arrangement direction of the first channel part 2A and the fourth channel part 2G. Therefore, the temperature rise of coolant flowing through the downstream portion of the fourth channel part 2G can be made small.

In Example 1, since low temperature coolant and high temperature coolant exchange heat through all of the partition parts 3A to 3D, temperature rise of coolant can be made small. Therefore, temperature rise of coolant in the channel part 2 can be made small, variation in a temperature distribution in the plate surface 1a of the cooling plate 1 can be reduced, and the temperature distribution can be made more uniform.

The cell 10 located at a center of the lateral width direction has higher temperature than the cells 10 located at both ends of the lateral width direction. Hence, the cooling plate 1 is configured such that entrance coolant 2 is placed at a position close to a substantially central portion of the lateral width direction of the cooling plate 1, and the first channel part 2A and the second channel part 2C are placed such that they extend along the arrangement direction of the cells 10. According to this, high temperature portions of the plurality of cells 10 can be cooled by coolant having lower temperature, and it is possible to cool the cells 10 efficiently.

The cooling plate 1 has such a structure that coolant flows in from a substantially central portion in the lateral width direction of the end surface part 7B, the coolant passes through the center portion of the cooling plate 1 while exchanging heat through the partition part 3, and the coolant flows out in a direction opposite from the flowing direction of the coolant entrance 4. Therefore, it is possible to effectively cool the center portion of the cooling plate 1, and the end of the cooling plate 1 can exchange heat with coolant of the center portion having low temperature through the partition parts 3B and 3D. Thus, surface temperatures of the cooling plate 1 can be made further uniform, and temperatures of the plurality of cells 10 which are in thermal contact with the cooling plate 1 can be made uniform. According to this, it is possible to provide a reliable and compact battery module structure in which temperature rise of the cells caused by the recharging and discharging operations of the cells 10 is reduced and is made uniform, and variation in the recharging and discharging amounts between the cells and battery lives is reduced.

Although the module structure in which the prismatic cells 10 are vertically placed on the cooling plate 1 is indicated in Example 1, the present invention is not limited to this structure, and the invention can be applied to any structures in which cylindrical cells or cells having other shapes can thermally be in contact through a cooling plate of this structure.

Figure 13:
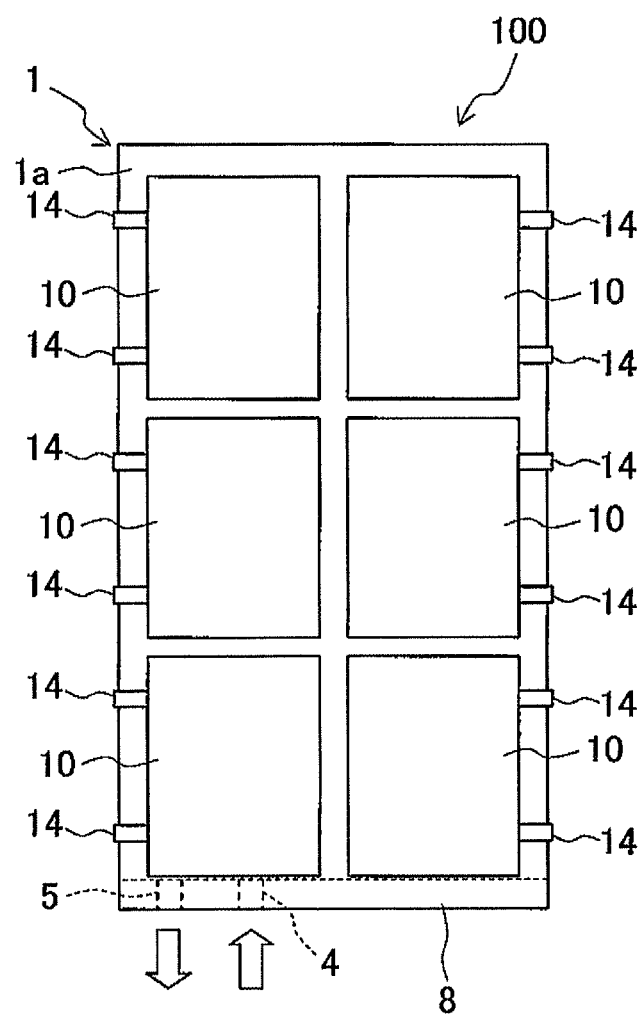
FIG. 13 is a plan view showing another example of the battery module according to the embodiment.

For example, as shown in FIG. 13, the prismatic cells 10 may be placed sideways on the cooling plate 1 so that the wide surfaces of the cells 10 come into thermal contact with the plate surface 1a of the cooling plate 1. According to this, it is possible to lower the height of the battery module 100, and there is an effect that the battery module can be made compact.

Example 2

Figure 5:
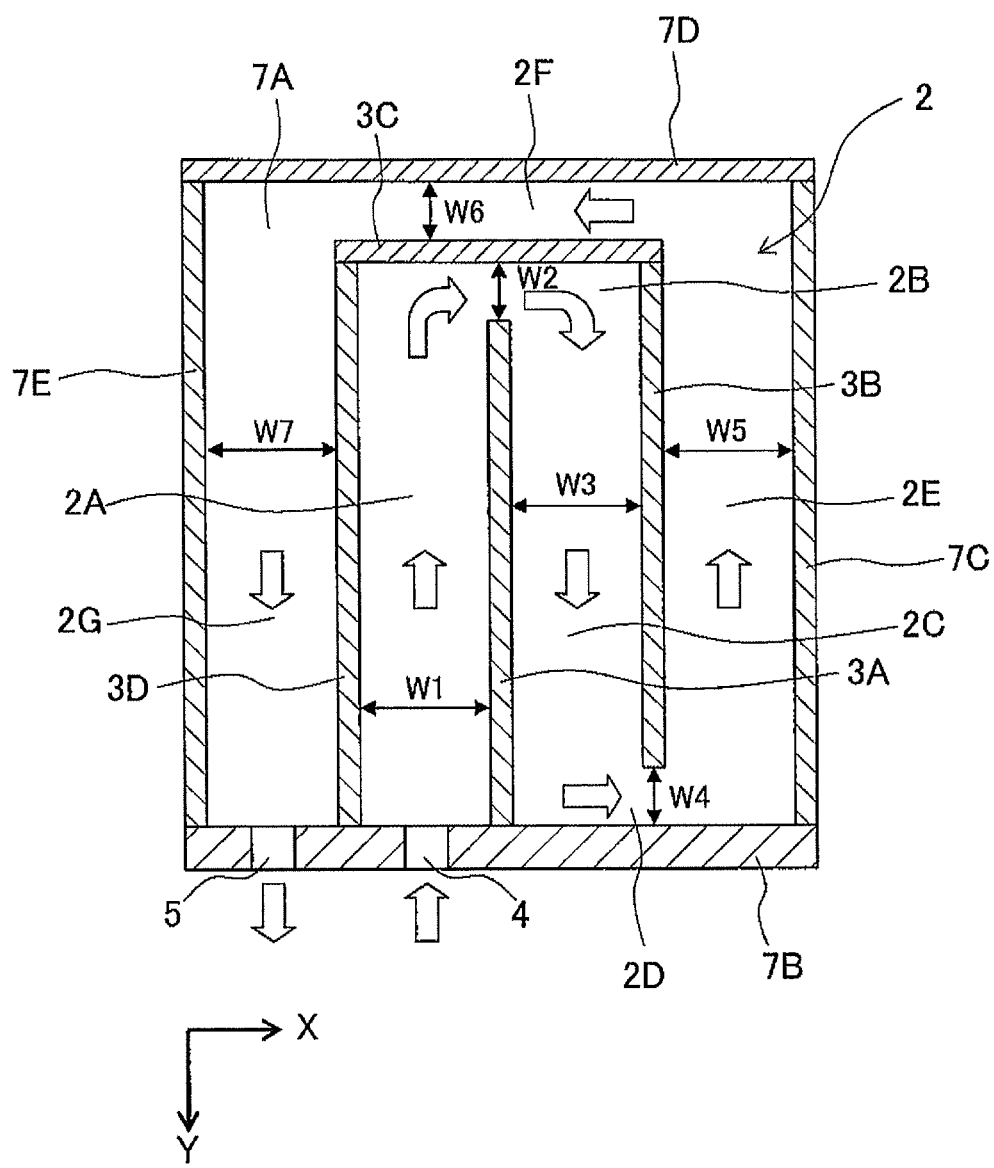
FIG. 5 is a sectional view of a cooling plate according to Example 2.

FIG. 5 is a sectional view of a cooling plate according to Example 2, and is a convenient diagram showing a flow of coolant.

Example 2 is characterized in that narrow portions having narrow channel cross sections are provided at intermediate portions of a channel of a channel part 2, speed of a flow of coolant is increased at the narrow portion, and after the coolant passes through the narrow portion, speed thereof is reduced, and the speed of coolant flowing through the channel part 2 is changed such that the speed is repeatedly increased and reduced.

A basic configuration of Example 2 is similar to that of Example 1. However, as compared with the configuration of Example 1, the channel widths W2, W4 and W6 of the first communication part 2B, the second communication part 2D and the third communication part 2F are smaller than the channel widths W1, W3, W5 and W7 of the first channel part 2A, the second channel part 2C, the third channel part 2E and the fourth channel part 2G, the narrow portions having the narrow channel cross sections are formed at the locations of the channel width W2, the channel width W4 and the channel width W6, and when coolant passes through the narrow portion, speed of a flow of the coolant is increased, and after the coolant passes through the narrow portion, speed thereof is reduced.

Coolant cools the entire cooling plate 1 along the flowing direction while repeatedly increasing and reducing the flowing speed, and the coolant is discharged from the coolant exit 5. In Example 2, flowing speed of coolant is increased at the narrow portions having narrow channel width (W2, W4 and W6), the heat transfer in the channel part 2 is enhanced and cooling performance is enhanced. Other channel widths W1, W3, W5 and W7 are equal to each other as in Example 1.

Locations where flow of coolant is reversed such as the first communication part 2B become dead spaces where coolant retains, hot spot where temperature becomes high in a pinpoint manner is generated on the cooling plate 1, and there is a possibility that equalization of temperatures of the plurality of cells 10 which are in thermal contact with the cooling plate 1 is deteriorated.

In contrast, according to Example 2, the channel widths W2, W4 and W6 of the first communication part 2B, the second communication part 2D and the third communication part 2F are made smaller than the channel widths W1, W3, W5 and W7 of the first channel part 2A, the second channel part 2C, the third channel part 2E and the fourth channel part 2G, the flowing speed of coolant is increased or reduced in the channel part 2 so that hot spot caused by retention of coolant in the cooling plate 1 is prevented from being generated. Therefore, it is possible to make uniform temperatures of the plurality of cells 10 which are in thermal contact with the cooling plate 1.

In Example 2, by employing the structure in which flowing speed of coolant is alternately increased and reduced in the channel part 2, it is possible to enhance the heat transfer in the channel part 2. According to this, it is possible to further effectively uniform the surface temperature of the cooling plate 1, and it is possible to further make uniform temperatures of the plurality of cells 10 which are in thermal contact with the cooling plate 1. Therefore, it is possible to provide a reliable and compact battery module structure in which temperature rise of the cells caused by the recharging and discharging operations of the cells 10 is further reduced and made uniform, and variation in the recharging and discharging amounts between the cells and battery lives is further reduced.

Example 3

Figure 6:
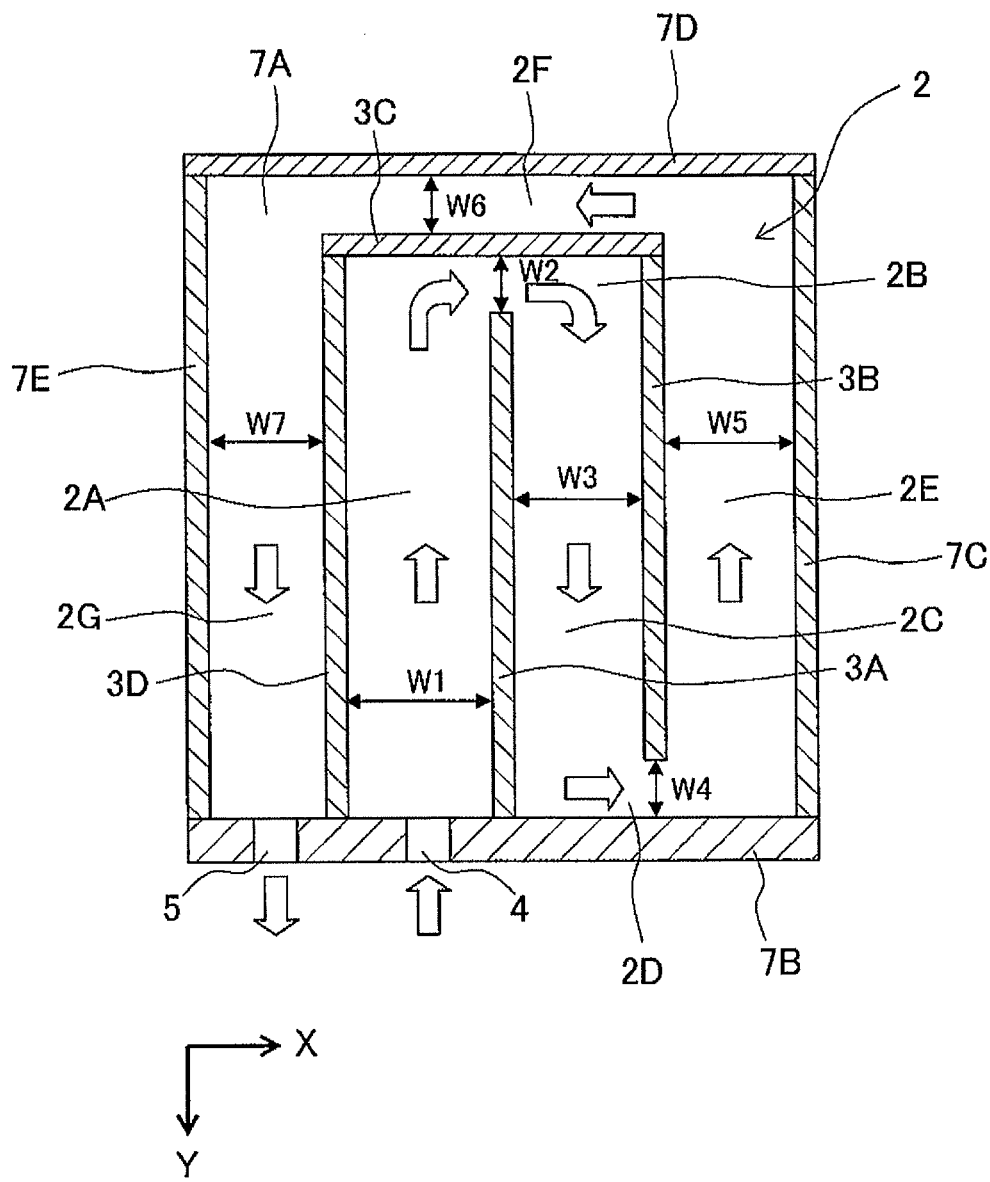
FIG. 6 is a sectional view of a cooling plate according to Example 6.

FIG. 6 is a sectional view of a cooling plate according to Example 3, and is a convenient diagram showing a flow of coolant.

Example 3 is characterized in that in addition to the configuration of above-described Example 2, a channel cross-sectional area of the channel part 2 on the upstream side is made narrower than that on the downstream side so that flowing speed on the downstream side of the channel part 2 is increased.

A basic configuration of Example 3 is similar to that of Example 2. However, as compared with the configuration of Example 2, the channel width W1 of the first channel part 2A is larger than the channel width W3 of the second channel part 2C and the channel width W5 of the third channel part 2E, and the channel width W7 of the fourth channel part 2G is smaller than the channel width W3 of the second channel part 2C and the channel width W5 of the third channel part 2E.

According to Example 3, flowing speed in the fourth channel part 2G on the side of the coolant exit 5 where the temperature of coolant is the highest is increased, a heat transfer coefficient with respect to the first channel part 2A on the side of the coolant entrance 4 where temperature of coolant is the lowest is enhanced, and temperature of coolant in the coolant exit 5 can further be reduced. Therefore, in addition to the effects described in Example 2, there are effects that it is possible to further uniform surface temperature of the cooling plate 1, and to further make uniform temperatures of the plurality of cells 10 which are in thermal contact with the cooling plate.

Effects of the present invention will be shown based on the following analysis. Previously set recharging and discharging patterns were carried out, and three-dimensional analysis was carried out. General thermal fluid software was used for the analysis.

Cooling plates 1 of the structures of Examples 1 to 3 respectively shown FIGS. 4, 5 and 6 were prepared. Material of the cooling plates 1 was corrosion-resistant aluminum, sizes of the cooling plates 1 were a lateral width (X direction) of 120 mm, a length (Y direction) of about 200 mm, and thicknesses of the upper plate part 6 and the partition part 3 of the cooling plate 1 were each 3 mm. A height of a channel was 6 mm, the channel widths W1 to W7 of Example 1 were set to 27 mm, and the channel widths W2, W4 and W6 of Example 2 were set to 20 mm. For Example 3, the channel width W1 was set to 32 mm, and the channel width W7 was set to 22 mm. Widths of other channels were the same as those of Example 2, and they were compared with each other and studied.

A flow rate of coolant (water solution of ethylene glycol 50%) was 3 liters/minute, entrance temperature of coolant was 20° C. and the analysis was carried out. As a heat value, heat input of about 200 W was set uniformly for the upper plate part 6 of the cooling plate 1.

Figure 7:
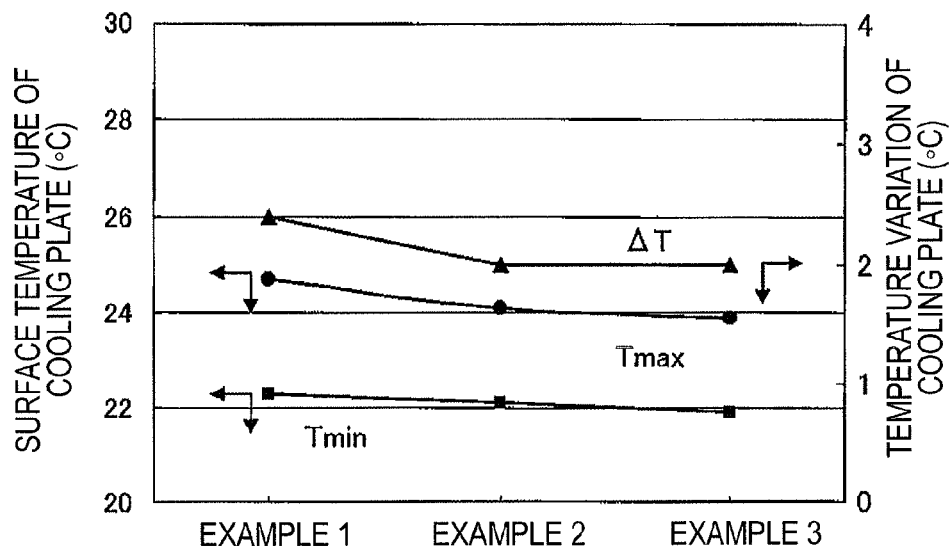
FIG. 7 is a graph showing an analysis result showing effects of Examples 1 to 3.

FIG. 7 shows a result of the analysis. A lateral axis shows Examples 1 to 3. Here, temperature variation of the cooling plate 1 means a temperature difference (ΔT) between the highest surface temperature (Tmax) and the lowest surface temperature (Tmin) on the plate surface 1a (surface portion of cooling plate 1 which comes into thermal contact with cell 10).

FIG. 7 shows that in the embodiment of the present invention, i.e., in the coolant channel structure (Examples 2 and 3) that an interior of the cooling plate 1 is cooled in the flowing direction while repeating deceleration and acceleration of flowing speed, the temperature of the cooling plate 1 is varied and the lowest surface temperature becomes low as compared with Example 1 in which the channel part 2 is configured with a simple constant channel width. Therefore, this analysis result shows that if the channel width is changed so that acceleration and deceleration of flowing speed of coolant are alternately carried out in the channel part 2 to suppress a case where the flow is uniformly developed, it is possible to enhance the heat transfer of the cooling plate 1.

According to this, equalization of a temperature distribution in the flowing direction of the cooling plate 1 is promoted, and it is possible to make uniform temperatures of the plurality of cells 10 which are in thermal contact with the cooling plate 1. Therefore, there are effects that make it possible to provide a reliable and compact battery module structure in which temperature rise of the cells caused by the recharging and discharging operations of the cells 10 is further reduced and made uniform, and variation in the recharging and discharging amounts between the cells and battery lives is further reduced.

Example 4

Figure 8:
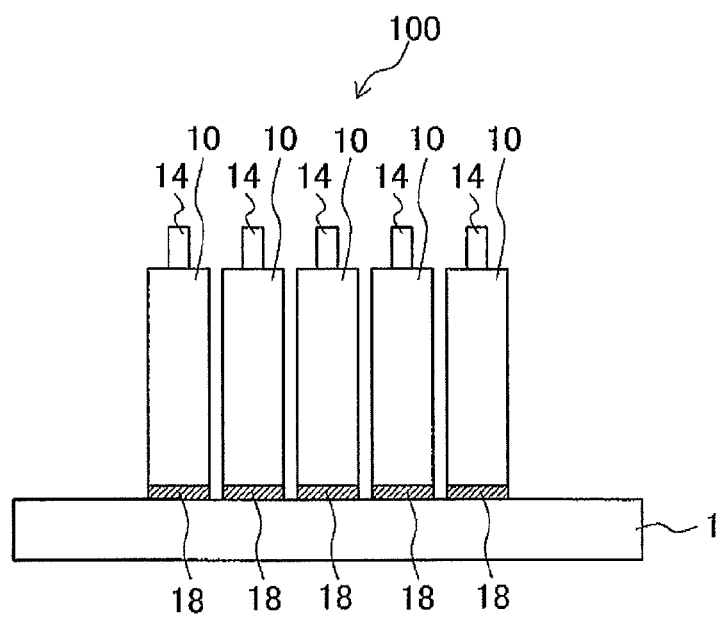
FIG. 8 is a side view of a battery module according to Example 4.

FIG. 8 is a side view of a battery module according to Example 4.

In Example 4, a plurality of cells 10 are in thermal contact with the cooling plate 1 through adhesive 18. A main component of the adhesive 18 is epoxy resin having excellent heat conductivity (equal to or higher than 1 W (m·K) and withstand voltage is high for example). According to Example 4, thermal contact between the cells 10 and the cooling plate 1 becomes excellent and even if the cells 10 are short-circuited, reliability of the module 100 can be enhanced. Even if the cells 10 are brought into thermal contact through heat transfer plastic having high withstand voltage instead of the adhesive 18, the same effects are exerted, and in addition to the above-described effects, there is also an effect that the reliability can further be enhanced.

Example 5

Figure 9:
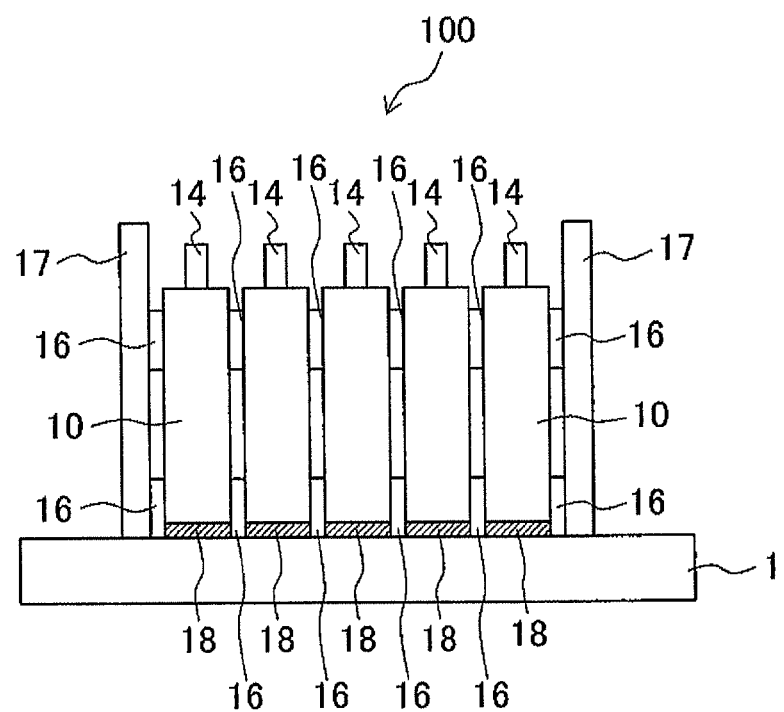
FIG. 9 is a side view of a battery module according to Example 5.

FIG. 9 is a side view of a battery module according to Example 5.

Example 5 shows a structure in which states of natural heat dissipation from the plurality of cells 10 are made the same between the cells 10 to further make uniform the temperatures of the cells 10. In Example 5, in addition to the configuration of Example 4, resin spacers 16 having the same thickness are interposed between the cells 10. To sandwich a group of cells formed by each cell 10 and the spacer 16 from both sides in the arrangement direction and to fix and tie the group of cells, a pair of metal end plates 17, 17 is provided. Therefore, in Example 5, of the heat value of the cells 10, conditions caused by the natural heat dissipation can also be made the same, and in addition to the Examples, there is an effect that temperatures of the plurality of cells 10 can be made further uniform.

Example 6

Figure 10:
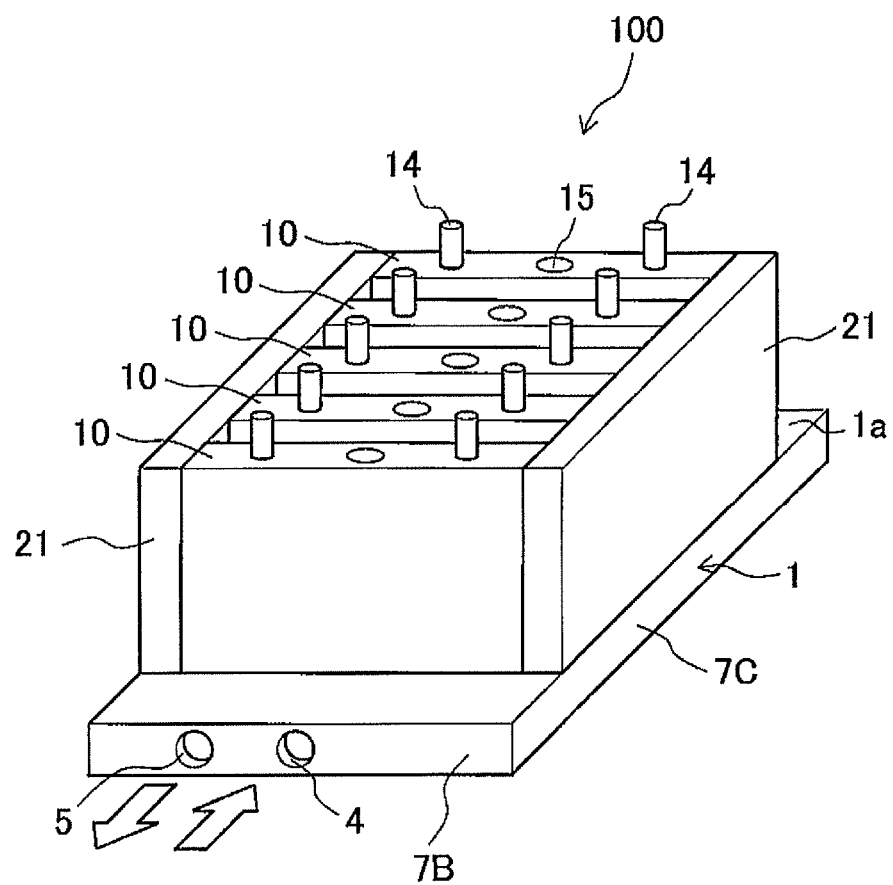
FIG. 10 is a perspective view of a battery module according to Example 6.

FIG. 10 is a perspective view showing a battery module according to Example 6.

A basic configuration of Example 6 is similar to that of Example 1. However, a pair of second cooling plates 21 is provided on both ends of the cells 10, and the second cooling plates 21 are in thermal contact with narrow surface parts of the cells 10. A lower end of the second cooling plate 21 is in thermal contact also with the plate surface 1a of the cooling plate 1, and the second cooling plate 21 has almost the same height as that of the lid body 13 of the cell 10. The second cooling plate 21 is formed from a plate-shaped member having a predetermined thickness which is made of metal material having high heat transfer such as aluminum alloy.

In Example 6, the second cooling plates 21 are cooled by heat transfer from the cooling plate 1, and the cells 10 are indirectly cooled by the second cooling plates 21. Like Example 5, the spacers 16 and the end plates 17 are provided, and the thermal contact condition can be made more excellent. Therefore, in addition to the effects of above-described Examples, there is an effect that temperatures of the plurality of cells 10 can be made further uniform.

Example 7

Figure 11A:
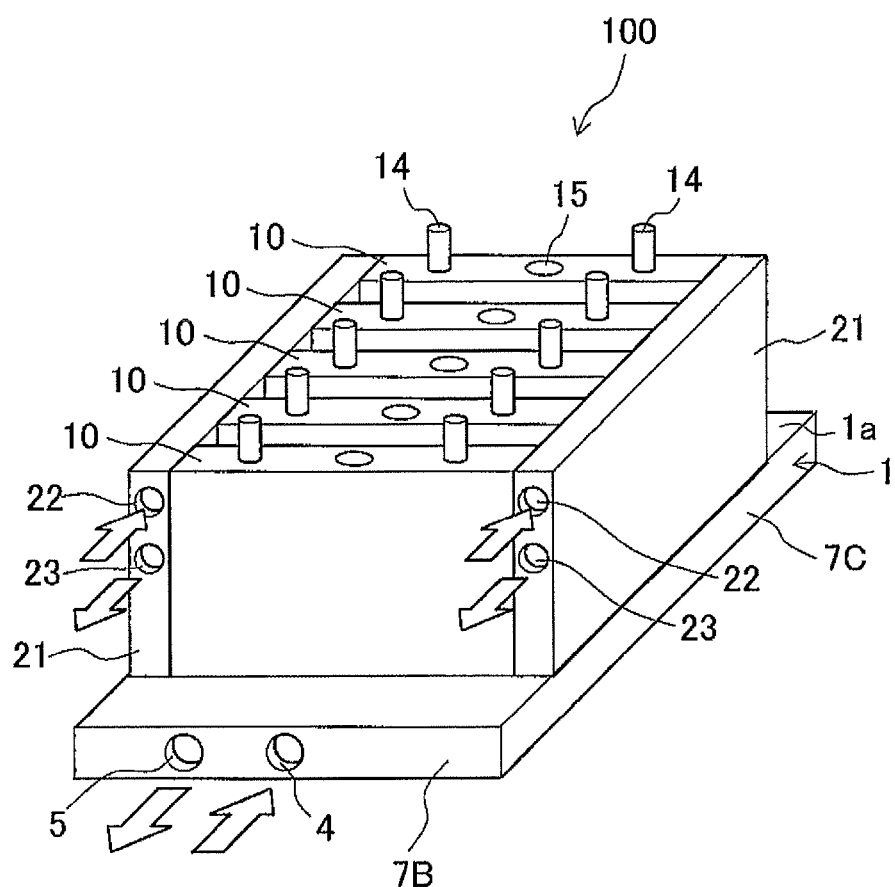
FIG. 11A is a perspective view of a battery module according to Example 7.
Figure 11B:
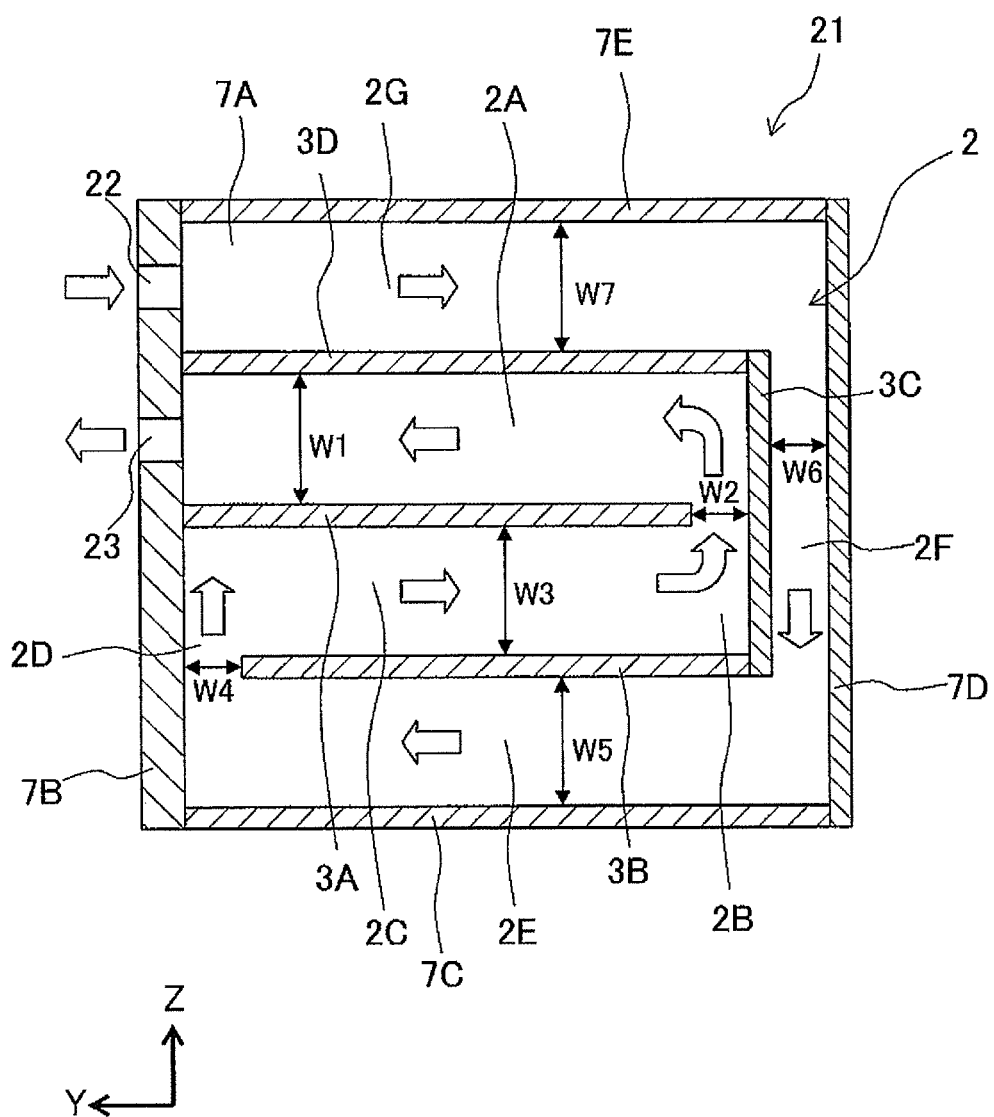
FIG. 11B is a sectional view of a side plate according to Example 7.

FIG. 11A is a perspective view showing a battery module according to Example 7, and FIG. 11B is a sectional view of a second cooling plate.

Example 7 is characterized in that each of the pair of second cooling plates 21 in Example 6 is provided with a channel part 2 through which coolant flows like the cooling plate 1.

The second cooling plate 21 is provided with a coolant entrance 22 at a position of the second cooling plate 21 close to an upper portion in a cell height direction of the end surface 7B side, and with a coolant exit 23 at a position of the second cooling plate 21 close to a central portion in the cell height direction. The coolant entrance 22 is in communication with the fourth channel part 2G, and the coolant exit 23 is in communication with the first channel part 2A. The channel part 2 is configured such that the fourth channel part 2G is placed on an upper side in the cell height direction and the third channel part 2E is placed on a lower side (on the side of cooling plate 21) in the cell height direction.

Coolant flows into the channel part 2 of the second cooling plate 21 from the coolant entrance 22, and straightly moves through the fourth channel part 2G toward one side of the arrangement direction. The coolant is deviated in the third communication part 2F and the flowing direction is turned, and the coolant straightly moves through the third channel part 2E toward the other side of the arrangement direction.

Thereafter, the coolant is deviated in the second communication part 2D and the flowing direction is turned, the coolant straightly moves through the second channel part 2C toward the one side of the arrangement direction, the coolant is deviated in the first communication part 2B and the flowing direction is turned, the coolant straightly moves through the first channel part 2A toward the other side of the arrangement direction, and the coolant is discharged from the coolant exit 23.

The channel part 2 has such a structure that the channel widths W2, W4 and W6 of the first communication part 2B, the second communication part 2D and the third communication part 2F are made smaller than the channel widths W1, W3, W5 and W7 of the first channel part 2A, the second channel part 2C, the third channel part 2E and the fourth channel part 2G, narrow portions where channel cross-sectional areas are narrow are formed at locations of the channel width W2, the channel width W4 and the channel width W6, and when coolant passes through the narrow portions, flow of the coolant is accelerated and after the coolant passes the narrow portions, flow of the coolant is decelerated.

The coolant cools the entire cooling plate 1 along the flowing direction while repeating the acceleration and deceleration of flow, and is discharged from the coolant exit 23. In Example 7, since flowing speed of coolant is accelerated at the narrow portions (W2, W4 and W6) where the channel width is narrow, heat transfer in the channel part 2 is enhanced, and the cooling performance is enhanced. Other channel widths W1, W3, W5 and W7 have the same sizes.

According to Example 7, coolant having the same temperature as that of coolant of the cooling plate 1 can be introduced into the coolant entrance 22 of the second cooling plate 21, and both side surfaces of the cells 10 can be cooled. Therefore, in addition to the effects of the above-described Examples, there are effects that it is possible to further lower the temperatures of the cells 10 and the temperatures of the cells 10 can be made uniform.

Temperature of cells 10 on the side of the lid body 13 of the battery can 12 is higher than that of cells 10 on the side of the bottom surface part of the battery can 12. In Example 7, coolant flows into the channel part 2 from the coolant entrance 22 provided at the position close to the upper portion of the end surface 7B side of the second cooling plates 21 in the height direction, and the coolant is discharged from the coolant exit 23 provided at the position close to the central portion in the height direction. Therefore, it is possible to cool the cells 10 efficiently.

Example 8

Figure 12:
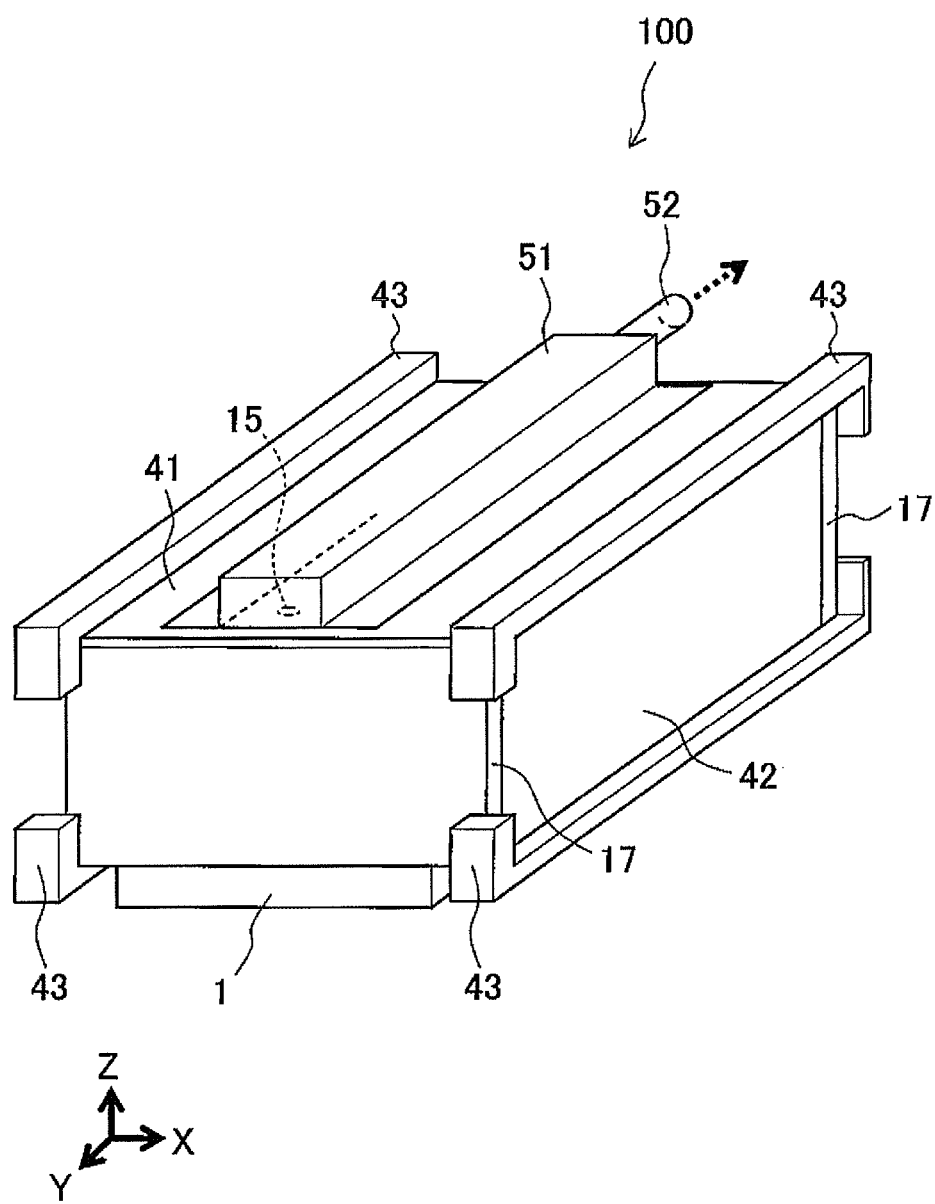
FIG. 12 is a perspective view showing an outward appearance of a battery module according to Example 8.

FIG. 12 is a perspective view showing an outward appearance of a battery module according to Example 8.

The battery module 100 has a group of a plurality of cells 10 laminated on one another through spacers 16 therebetween (see FIG. 9). Both sides of the battery module 100 in the arrangement direction are covered with the pair of end plates 17. A lower portion of the battery module 100 is covered with the cooling plate 1, and an upper portion of the battery module 100 is covered with an upper cover 41. Both sides of the battery module 100 in the lateral width direction are covered with the pair of side plates 42.

The cooling plate 1, the pair of end plates 17, the upper cover 41 and the pair of side plates 42 are integrally coupled to one another through four coupling members 43. Each of the coupling members 43 has a length extending between the pair of end plates 17, 17 in the arrangement direction.

The upper cover 41 has a gas release passage 51 extending in the arrangement direction. The gas release passage 51 is in communication with the gas release vents 15 of the cells 10, and when the cell is in an abnormal condition, gas discharged from the gas release vent 15 is made to flow into gas release passage 51, and the gas is discharged out from the gas release pipe 52. The cooling plate 1 is provided on a lower portion of the battery module 100, and both ends of the battery module 100 in the lateral width direction are sandwiched by the pair of side plates 42 and hermetically closed.

According to Example 8, the flow of coolant is the same as those of the Examples, there is a similar effect concerning the cooling performance of the cells, and there is an effect that it is possible to provide a further compact and safe battery module.

Although the embodiment of the present invention has been described in detail, the invention is not limited to the embodiment, and a design of the embodiment can variously be modified within a range not departing from the spirit of the invention described in claims. For example, the embodiment is described in detail for easily describing the invention, and the invention is not limited to a structure having all of the described configurations. A portion of a configuration of a certain embodiment can be replaced by a configuration of another embodiment, and a configuration of a certain embodiment can be added to a configuration of another embodiment. It is possible to add a configuration to a portion of a configuration of each of the embodiments, and to delete a portion of a configuration of the embodiment, and a portion of a configuration of the embodiment can be replaced by another configuration.

REFERENCE SIGN LIST 1 cooling plate
1a plate surface
2 channel part
3 partition part
4 coolant entrance
5 coolant exit
6 upper plate part
7 container part
8 end plate
9 partition
10 cell
12 epoxy resin
16 spacer
17 end plate
100 battery module

The invention claimed is:

1. A battery module comprising a plurality of cells, a cooling plate having a plate surface on which the plurality of cells are arranged, and a channel part which is formed in the cooling plate and through which coolant can flow, wherein
   the cooling plate further includes:
      a plurality of surface end parts surrounding the channel part,
      an entrance for the coolant formed in a substantially center portion of one of the surface end parts, and
      an exit for the coolant through which the coolant flows out from in a direction opposite from a direction of the coolant flowing through the entrance, the exit being formed in a substantially outermost portion of the cooling plate,
   the channel part includes:
      a first channel part, a second channel part, a third channel part and a fourth channel part which extend in an arrangement direction of the plurality of cells, and
      a first communication part which turns a flowing direction of the coolant in the first channel part and the second channel part, a second communication part which turns a flowing direction of the coolant in the second channel part and the third channel part, and a third communication part which turns a flowing direction of the coolant in the third channel part and the fourth channel part,
   the coolant in the first channel part and the coolant in the second channel part flow in opposite directions on opposing sides of a first partition part, the coolant in the second channel part and the coolant in the third channel part flow in opposite directions on opposing sides of a second partition part, the coolant in the first communication part and the coolant in the third communication part flow in opposite directions on opposing sides of a third partition part, the coolant in the fourth channel part and the coolant in the first channel part flow in opposite directions on opposing sides of a fourth partition part, and
   the fourth partition part forms a sidewall of the first channel part and a sidewall of the fourth channel part, and the channel part is configured to allow heat exchange between coolant in the first channel part and coolant in the fourth channel part, through the fourth partition part.

2. The battery module according to claim 1, wherein a cross-sectional area of the first communication part is smaller than those of the first channel part and the second channel part.

3. The battery module according to claim 1, wherein a cross-sectional area of the second communication part is smaller than those of the second channel part and the third channel part.

4. The battery module according to claim 1, wherein a cross-sectional area of the third communication part is smaller than those of the third channel part and the fourth channel part.

5. The battery module according to claim 4, wherein a cross-sectional area of the first channel part is smaller than that of the second channel part.

6. The battery module according to claim 5, wherein a cross-sectional area of the third channel part is larger than that of the fourth channel part.

7. The battery module according to claim 1, wherein each of the plurality of cells includes a flat box-shaped battery container, the battery container including: a battery can having a laterally long rectangular bottom surface part, a pair of opposed wide surface portions which are bent at a pair of long sides of the bottom surface part, and a pair of opposed narrow surface parts which are bent at a pair of short sides of the bottom surface part; and a lid body which closes an upper opening of the battery can, and the cooling plate is attached in such a coupling state that heat can be conducted between the plate surface of the cooling plate and at least any one of the bottom surface part, the wide surface part and the narrow surface part of the battery can.

8. The battery module according to claim 7, wherein the plurality of cells are arranged such that the bottom surface parts of the battery containers are placed on the same plane and the wide surface portions of adjacent cells are opposed to each other, and the cooling plate includes a first cooling plate attached in such a coupling state that the plate surface can transfer heat to the bottom surface part of the battery container.

9. The battery module according to claim 8, wherein the cooling plate includes a pair of second cooling plates attached in such a coupling state that the plate surface can transfer heat to the pair of narrow surface parts of the battery container.

10. The battery module according to claim 9, wherein each of the second cooling plates includes the first channel part, the second channel part, the third channel part, the fourth channel part, the first communication part, the second communication part and the third communication part, the fourth channel part is placed on an upper side in a cell height direction, and the third channel part is placed on a lower side in the cell height direction.

11. The battery module according to claim 10, wherein a coolant entrance is provided in an end surface part of each of the second cooling plates on the other side of an arrangement direction of the second cooling plate at a position close to an upper location in the cell height direction, the coolant flows in through the coolant entrance, and a coolant exit is provided in an end surface part of the second cooling plate on the other side of the arrangement direction of the second cooling plate at a position close to a central location of the cell height direction, and the coolant flows out through the coolant exit.

12. The battery module according to claim 3, wherein a cross-sectional area of the first channel part is larger than that of the second channel part.

13. The battery module according to claim 4, wherein a cross-sectional area of the first channel part is larger than that of the second channel part.

14. The battery module according to claim 12, wherein a cross-sectional area of the third channel part is larger than that of the fourth channel part.

15. The battery module according to claim 13, wherein a cross-sectional area of the third channel part is larger than that of the fourth channel part.

16. The battery module of claim 1, wherein the channel part is disposed entirely on an opposite side of the plate surface on which the plurality of cells are arranged.

17. The battery module of claim 1, wherein the exit is formed in the one of the surface end parts in which the entrance is formed.

18. The battery module of claim 1, wherein the first partition part forms a sidewall of the first channel part and a sidewall of the second channel part, and the channel part is configured to allow heat exchange between coolant in the first channel part and coolant in the second channel part, through the second partition part.

* * * * *